Nov. 1, 1927.
M. B. STAZAK
ELECTRIC RECTIFIER
Filed July 17, 1920
1,647,418
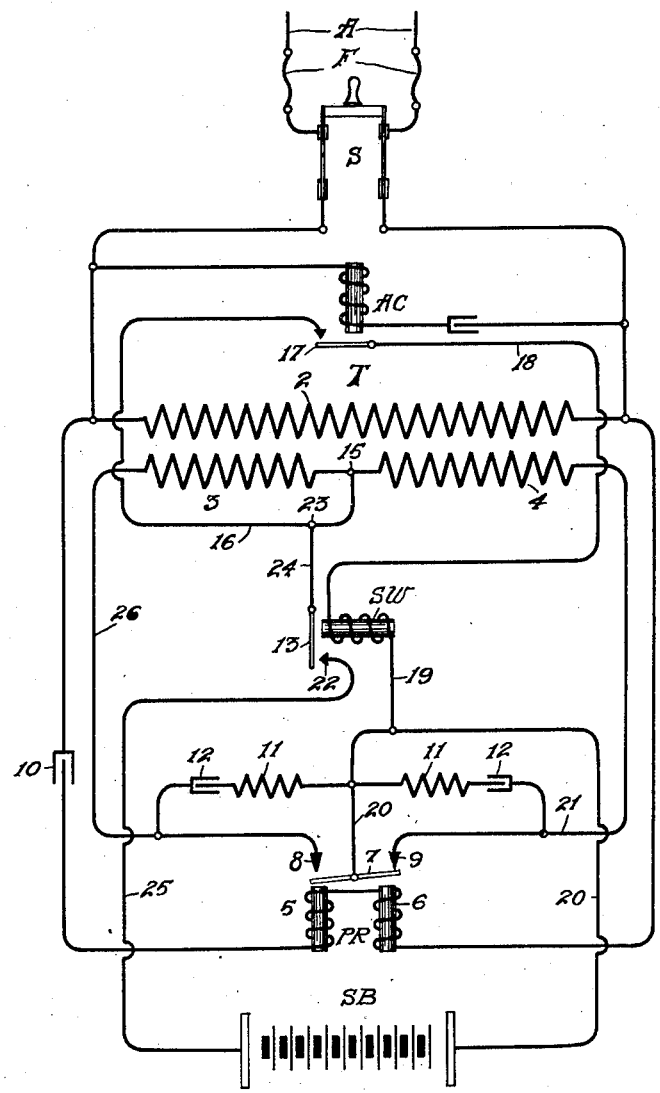
Inventor:
Michael B. Stazak.
By Curtis B. Camp.
Attorney.

Patented Nov. 1, 1927.

1,647,418

UNITED STATES PATENT OFFICE.

MICHAEL B. STAZAK, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

ELECTRIC RECTIFIER.

Application filed July 17, 1920. Serial No. 397,012.

My invention relates to electric rectifiers and has to do more particularly with that type of rectifiers in which a vibrating contact or contacts are employed which move, in synchronism with the frequency of the supply source of alternating current, to open and close circuits in such a way as to produce unidirectional or direct current for charging accumulators or storage batteries. My improved rectifying device and my improved circuit arrangement are especially adapted for use in charging storage batteries, and an object of my invention is to provide a device of the class described which is simple in construction but at the same time most positive and efficient in its operation.

A feature of my invention is the provision of an alternating current relay connected in circuit with my rectifying device in such a manner as to connect the rectified current to the storage batteries for charging purposes, only when the supply source of current is sufficient and connected to the rectifier relay. The relay is so connected that in case the supply source of alternating current fails, the relay restores and opens the charging circuit containing the storage battery, preventing back discharge from said storage battery.

A further feature of my invention is the provision of a slow energizing switching relay that permits the rectifier to swing into full operation before the rectified current is connected to the storage battery.

The above features, as well as others, will be more fully hereinafter described in the ensuing specification, and for a more complete understanding of my invention reference may be had to the accompanying drawing, in which I diagrammatically illustrate the rectifier of my invention.

Referring to the accompanying drawing, I have shown diagrammatically the circuit arrangement of the electric rectifier embodying the principles of my invention. The mechanical structure of the mechanism of the polarized relay and alternating circuit relay may be of any of the well-known approved types, and it is, therefore, thought unnecessary to further describe in detail the mechanical construction of the same.

At A I show a pair of conductors connected to a source of alternating current, such as is used for lighting purposes and for operating motors, which generally has a potential of 110 volts and a frequency of 60 cycles. At F I show a pair of fuses for protecting the apparatus connected to the conductors A, and a single-throw switch S for connecting and disconnecting the said mechanism and the source of current. The transformer T has a primary winding 2 connected across the source of alternating current and a pair of secondary windings 3 and 4. An alternating current relay AC is also bridged across the source of alternating current and is energized when connection is made with the said source, for purposes as will be presently described. The polarized relay PR receives current from the alternating current source causing its armature 7 to vibrate in synchronism therewith, and its vibrating armature 7 which alternately closes contacts 8 and 9 receive current from the secondary windings 3 and 4 of the transformer T and rectify or convert it into unidirectional or direct current. The polarized relay PR has its operating magnets 5 and 6 connected directly across the source of alternating current and the relay is provided with an armature 7 for contacting with said contacts 8 and 9.

I place a condenser 10 in circuit with the magnets 5 and 6 of the polarized relay PR to neutralize the effect of the impedance of the magnets of said relay PR, thereby causing its armature 7 to operate in synchronism with the alternating current and not lag behind the alternations of the current. I also bridge resistances 11 and condensers 12 around the contacts 8 and 9 of the relay PR to decrease the spark caused by the breaking of these contacts by the magnets of the polarized relay PR. I also provide a switching relay SW, which relay SW is slow to pick up due to the large air gap between its armature 13 and core so that when the alternating current source is connected, the polarized relay PR will be in full synchronism with the said source before the armature 13 of the said relay SW is fully attracted to close its alternate contact to connect the rectified current to the storage battery SB which is to be charged.

Having described in general the apparatus embodied in my invention, I will now describe more in detail its operation.

When the switch S is closed, alternating current from the alternating current source establishes a local operating circuit through the electromagnets 5 and 6 of the polarized relay PR, which operates to vibrate its armature 7 in synchronism with the alternations or reversals of the alternating current source connected to the conductors A. The closure of the switch S also establishes an energizing circuit for the alternating current relay AC. A further result due to the closure of the single-throw switch S is the connection of the primary winding 2 of the transformer T across the alternating current source. Assuming that an impulse of one polarity is traversing the primary winding 2 of the transformer T in one direction, say from left to right, and that the armature 7 of the polarized relay PR is in the position shown in the drawing, an impulse of current will be induced in the secondary windings 3 and 4 of the transformer T in the opposite direction, from right to left. The induced impulse of current will thus flow from the secondary winding 4 of the transformer T and from the central point 15 of the secondary windings 3 and 4 of the transformer T, over conductor 16, through alternate contact 17 of the alternating current relay AC, which relay AC energized when the switch was closed to connect the alternating current source to the mechanism, over conductor 18, through the winding of the switching relay SW, conductors 19 and 20, armature 7 and closed contact 9 of the polarized relay PR, and conductor 21 to the other side of the secondary winding 4 of the transformer T.

The impulse of current that passes through the winding of the switching relay SW energizes the electromagnet, but the armature 13 of the said relay SW is slow to approach due to a large air gap between the said armature 13 and the core of the electromagnet of the relay SW, thus permitting the armature 7 of the polarized relay PR to get in step or vibrate in full synchronism with the alternating current source before the armature 13 of the said relay SW is fully attracted. The closure of alternate contact 22 of the switching relay SW now permits the rectified current to pass from the point 15 between the windings 3 and 4 of the transformer T, over conductor 16 to the point 23 and dividing at this point. Part of the current passes over the path heretofore described and the other part of the current passes over conductor 24, through alternate contact 22 of relay SW, conductor 25, through the storage batteries SB to be charged, over conductor 20, armature 7 and closed contact 9 of the polarized relay PR and over conductor 21 to the other side of the secondary winding 4 of the transformer T.

Now, when an impulse of the opposite polarity is sent through the primary winding 2 of the transformer T from right to left, and when the armature 7 of the polarized relay PR has shifted to close its contact 8 and open contact 9, an impulse of current is induced in the secondary windings 3 and 4 of the transformer T in the opposite direction, from left to right. The induced impulse of current will flow from the winding 3 of the transformer T, over conductor 16 to the point 23, the current dividing at this point, one path extending over conductor 16, alternate contact 17 of relay AC, conductor 18, through the winding of relay SW, conductors 19 and 20, armature 7 and closed contact 8 of the polarized relay PR and conductor 26 to the other side of the secondary winding 3 of the transformer T, and the other path extends from the point 23 over conductor 24, through alternate contact 22 of relay SW, over conductor 25, through the storage battery SB, conductor 20, armature 7 and closed contact 8 of polarized relay PR and over conductor 26 to the other side of the secondary winding 3 of the transformer T. The path of the rectified current through the winding of the switching relay SW maintains the said relay SW energized so that the rectified current may pass through the storage battery to charge the same.

The alternating current relay AC, of course, maintains its contact 17 closed the entire time that the switch S is closed, and the potential of the supply source of current is sufficient to hold the armature of relay AC energized. Should, for any reason, the supply source of current fail, the relay AC will de-energize and open the circuit of relay SW, thereby disconnecting the secondary windings of the transformer from the storage battery.

From the foregoing, it will be seen that my device is entirely automatic, that all that it is necessary to do to charge the storage batteries is to close the switch S and the device will do the rest.

The switch S may be located at a remote point. This feature is of particular advantage if the charging device is used to charge the batteries of a P. B. X. switchboard.

While I have described a specific form of invention, I do not wish to be limited to the same, as changes and modifications will readily suggest themselves to those skilled in the art, and I, therefore, aim to cover all such changes and modifications as come within the spirit and scope of the appended claims.

Having described my invention, what I claim as new and desire to secure by United States Letters Patent, is:

1. The combination of a source of alternating current and a storage battery to be charged therefrom, a transformer having a primary and a secondary winding, said primary winding connected to said source of current, a rectifier connected to the secondary winding of said transformer, comprising a polarized relay, a vibrating armature actuated thereby adapted to engage a pair of contacts alternately, means including condenser and resistance elements to cause the said armature to operate in synchronism with said source of alternating current and to prevent the armature from sparking at its contacts, a relay and controlling means associated therewith for connecting rectified current from said rectifier to said storage battery, an alternating current relay connected across the source of alternating current, an energizing circuit for said first relay controlled by said alternating current relay, said means of said first relay being ineffective until said rectifier is operating in synchronism with said source of current.

2. The combination of a source of alternating current and a storage battery to be charged therefrom, a transformer provided with a primary and a secondary winding and having its primary winding connected to said source of alternating current, a rectifier connected to said source of alternating current and said transformer, including a polarized relay, a vibrating armature actuated thereby and adapted to engage a pair of contacts alternately, means including condenser and resistance elements to cause said armature to operate in synchronism with said source of alternating current and to prevent sparking at the pair of contacts, a relay slow to energize for connecting the storage battery to the rectifier, and an alternating current relay bridged across the supply source of current for controlling the energization of said slow acting relay.

3. The combination of a source of alternating current and an accumulator adapted to be charged from said source of current, a transformer having primary and secondary windings, a rectifier including a motor device comprising a polarized relay, a vibrating armature actuated thereby and adapted to engage a pair of contacts alternately, means including condenser and resistance elements to cause said armature to operate in synchronism with the said source of alternating current and to prevent sparking at the contacts, a switch for connecting the primary winding of said transformer and the motor device of said rectifier across said source of current, rectifying means for said rectifier connected to the secondary windings of said transformer, an alternating current relay adapted to be energized when the source of current is connected to the primary winding of said transformer, a slow acting relay for connecting the secondary windings of said transformer and the rectifying means of said rectifier to said accumulator, and a circuit for said slow acting relay controlled by said alternating current relay and said motor device.

4. The combination of a source of alternating current and an accumulator to be charged therefrom, a transformer provided with primary and secondary windings, a rectifier comprising a polarized relay, a vibrating armature adapted to engage a pair of contacts alternately, means, including condenser and resistance elements, to cause the said armature to operate in synchronism with the said alternating current and to prevent sparking at the contacts, including a motor device, a switch for connecting the motor device of said rectifier and the primary winding of said transformer to said source of current, rectifier contacts for said rectifier and operatively associated with said motor device, a slow acting device for operatively connecting the rectifier contacts to said accumulator, and a relay bridged across the source of alternating current, said relay and said rectifier contacts controlling the energization of said slow-acting relay.

5. The combination of a source of supply current and a storage battery to be charged therefrom, a transformer having primary and secondary windings, a rectifier comprising a polarized relay, a vibrating armature actuated thereby and adapted to alternately engage a pair of contacts, means including condenser and resistance elements to cause said armature to operate in synchronism with said alternating current and to prevent sparking at the contacts, including a motor device, a switch for connecting the primary windings of said transformer and the motor device of said rectifier to said source of supply current, rectifying contacts for said rectifier connected to the secondary windings of said transformer, a slow acting relay for operatively connecting the secondary windings of said transformer and the rectifier contacts of said rectifier to said storage battery, and an alternating current relay bridged across said source of supply current, said alternating current relay and said rectifying contacts controlling the circuit of said slow acting relay.

6. The combination of a source of alternating current and an accumulator adapted to be charged therefrom, a transformer having primary and secondary windings, a rectifier, a switch, including a motor device, circuits controlled by said switch for connecting the motor device of said rectifier and the primary winding of said transformer to said supply source of current, rectifier contacts for said rectifier connected to the secondary windings of said transformer, a vibrating contact for said rectifier contacts and controlled by said motor device and adapted to make contact with only one of said rectifier contacts at a time, a slow acting relay having one of its terminals connected to said vibrating contact, means including condenser and resistance elements to cause said vibrating contact to operate in synchronism with said source of alternating current and to prevent sparking between said vibrating contact and said rectifier contacts, and an alternating current relay for connecting the other terminal of said first relay to the secondary windings of said transformer to complete an energizing circuit for said slow acting relay, a contact controlled by said slow acting relay for operatively connecting said accumulator to the secondary windings of said transformer and to said rectifier contacts whereby it receives unidirectional current from said rectifier and transformer.

7. The combination of a source of supply current and a storage battery to be charged therefrom, a transformer having primary and secondary windings, a rectifier including a motor device, a switch for connecting the primary windings of said transformer and the motor device of said rectifier to said source of supply current, rectifying contacts for said rectifier connected to the secondary windings of said transformer, means including condenser and resistance elements to cause said motor device to operate in synchronism with said alternating current and to prevent sparking between said motor device and said rectifier contacts, a slow-acting relay for operatively connecting the secondary windings of said transformer and the rectifying contacts of said rectifier to said storage battery, an alternating current relay bridged across said source of supply current, said alternating current relay and said rectifying contacts controlling the circuit of said slow-acting relay, said slow-acting relay so constructed that it does not operate completely until said motor device operates in synchronism with said source of alternating current.

Signed by me at Chicago, in the county of Cook and State of Illinois, this 14 day of July, 1920.

MICHAEL B. STAZAK.